Patented June 1, 1954

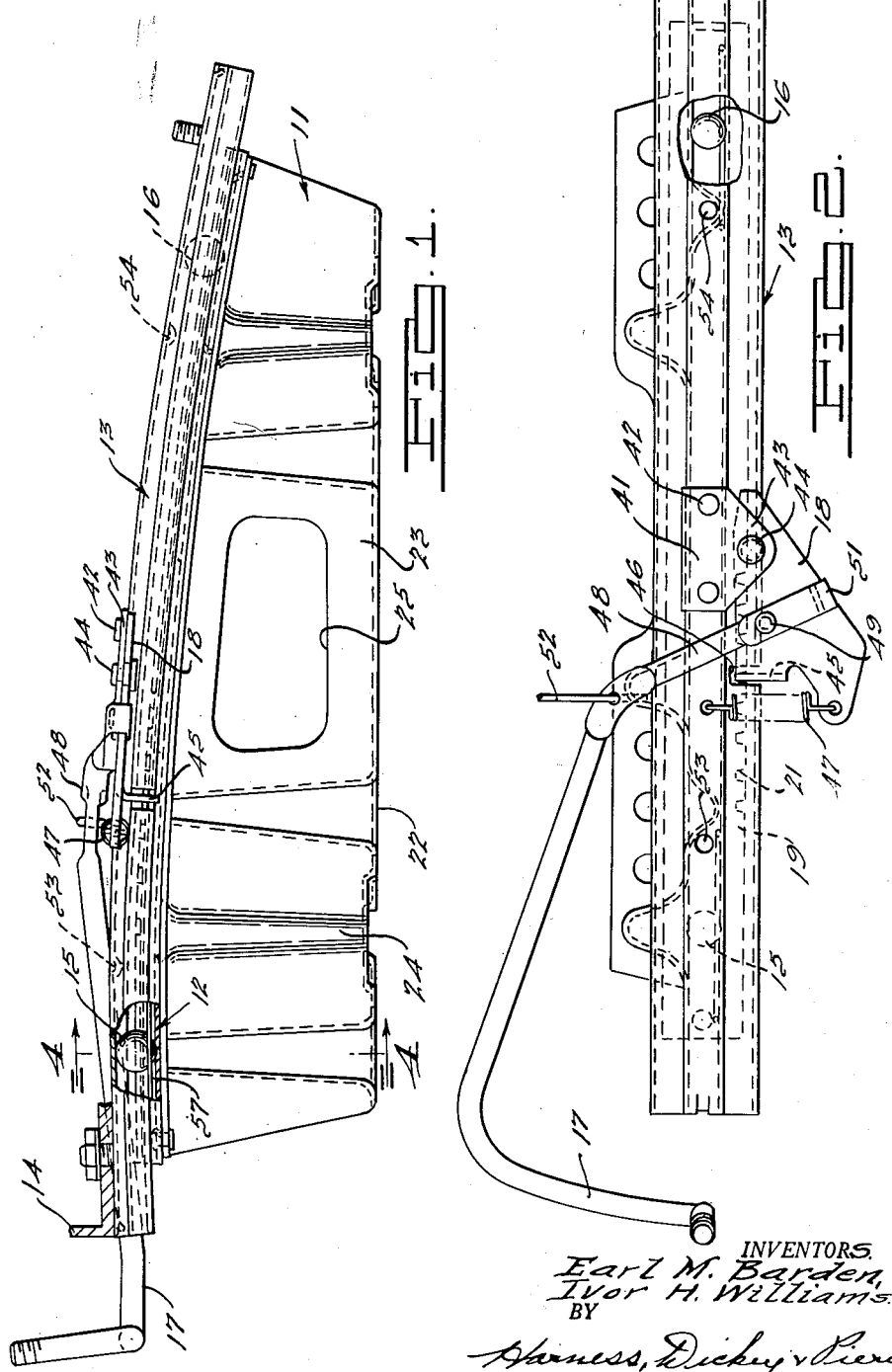

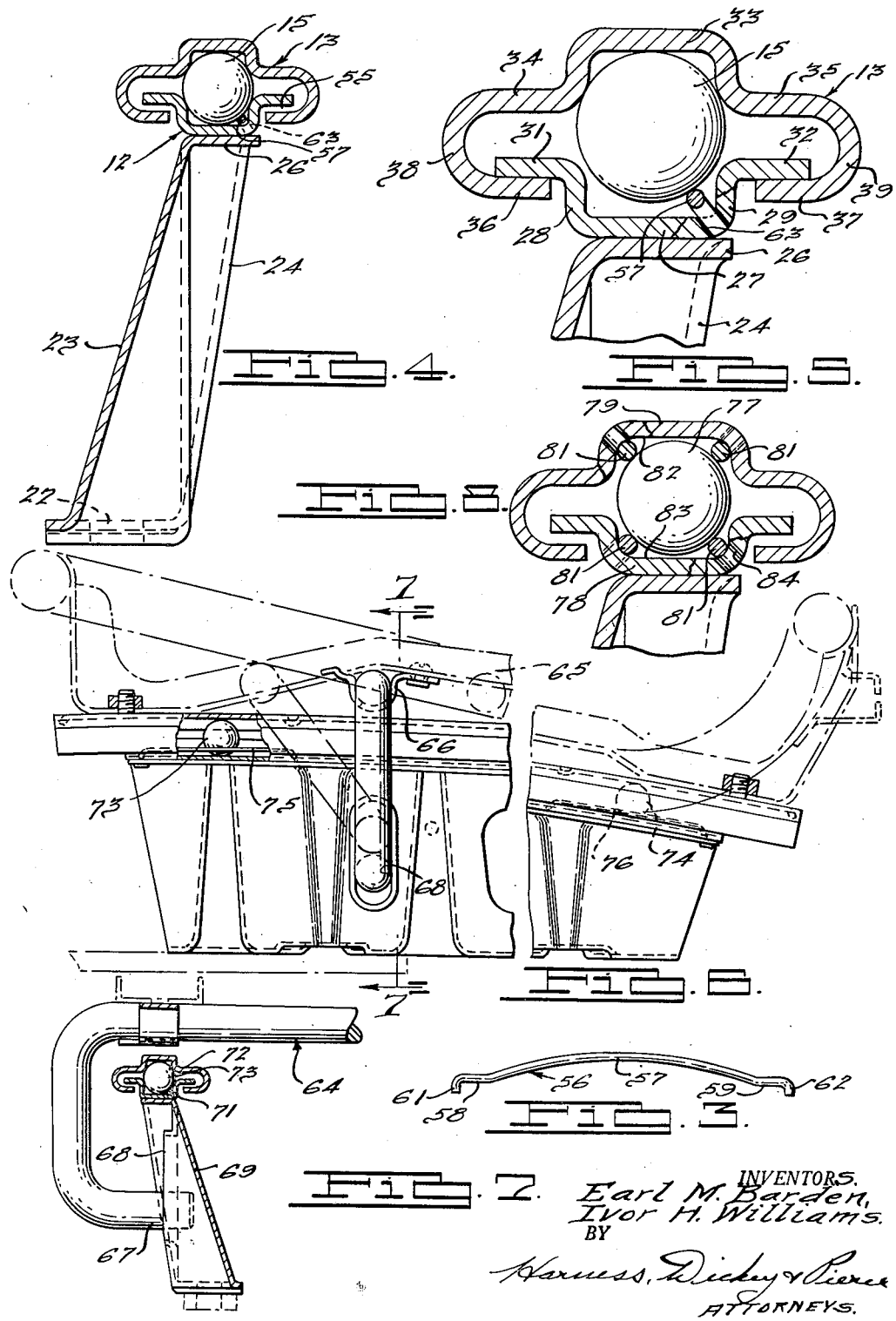

2,679,889

UNITED STATES PATENT OFFICE 2,679,889

SEAT SLIDE FOR AUTOMOTIVE VEHICLES

Earl M. Barden, Grosse Pointe Farms, and Ivor H. Williams, Birmingham, Mich., assignors to Hupp Corporation, Cleveland, Ohio, a corporation of Virginia Application June 19, 1951, Serial No. 232,428

4 Claims. (Cl. 155—14)

1

This invention relates to seat slides for automotive vehicles, and particularly to improvements in the bearing construction of such seat slides, especially those of the anti-friction bearing type.

It is an object of the present invention to provide an improved construction for seat slides of the anti-friction type, which reduces the number of essential parts in the device, and which results in an efficient construction while greatly reducing the cost of manufacture and assembly of the slide.

It is another object to provide an improved seat slide of the above character, which utilizes the principle of a slide supported on a pair of stationary rails spaced by anti-friction means, and in which the anti-friction elements are maintained at all times in their proper position during the operation of the slide, without the necessity of a separate cage element for this purpose.

It is a further object to provide an improved seat slide of the above character, which comprises a pair of stationary inclined tracks or rails which are telescopically engaged by slides attached to the seat, and in which a pair of spaced ball bearings are disposed between each rail and its adjacent slide. In association with this object, it is within the contemplation of this invention to provide a retaining element adjacent each of said ball bearings, said retaining element maintaining the proper position of its corresponding bearing at all times during the operation of the slide, and especially when the rails and slides are relatively tilted, for example, when weight is concentrated only at the back of the seat.

It is also an object, in one form of the invention, to provide an improved seat slide of the ball bearing type which is provided with retaining means as above described, this retaining means also serving to prevent the hardened steel ball bearings from indenting the surfaces of the rail or slide members due to continued vibration.

Other objects, features, and advantages of the present invention will become apparent from the subsequent description taken in conjunction with the accompanying drawings.

In the drawings:

Figure 1 is a side elevational view of the improved seat slide of this invention with parts broken away to show the novel ball bearing retaining means;

Figure 2 is a plan view of the seat slide, showing the lateral positioning of the retaining means, and with parts broken away for clarity.

2

Figure 3 is a detail view of a single retaining element shown in its free and unrestrained condition;

Figure 4 is a cross-sectional view taken along the line 4—4 of Fig. 1 and showing the engagement of the retaining means with the ball bearing during the normal positioning of rail and slide;

Figure 5 is an enlarged fragmentary view similar to Fig. 4, but showing the slide lifted relative to the rail and the consequent position of the bearing retaining element;

Figure 6 is a fragmentary side elevational view similar to Fig. 1 but showing the improved retaining means applied in a modified seat slide of the torque bar type;

Figure 7 is a cross-sectional view taken along the line 7—7 of Fig. 6, and showing the relative positions of the torque bar, bearing and retaining means; and Figure 8 is a cross-sectional view showing a further modification of the retaining means in which the ball bearing is prevented from contacting the surfaces of the rail and slide members.

The invention is shown as embodied in a seat slide for an automotive vehicle which has a pair of stationary rails secured to the deck of the vehicle, a pair of slides movably mounted on said rails and attached to the seat of the vehicle, and a pair of ball bearings in longitudinally spaced relation between each rail and slide. It will be recognized that this construction is of a conventional type, and the invention resides in novel means for retaining the ball bearings in position despite tilting movement of the slides relative to the rails, which would normally free the ball bearings for rolling movement toward the lower end of the rail. This condition, which would be present especially in slides of the inclined type which impart a vertical as well as a horizontal movement to the seat, would result in one or more ball bearings being out of position for the next movement of the slide, and thus interfering with the conventional limiting stops on the rail or slide.

The invention contemplates the use of a plurality of elongated wire springs which are installed within the rails and which are engageable with the ball bearings because of their tendency to expand outwardly. This tendency will maintain the engagement of an individual spring with its corresponding ball bearing when the slide is tilted about the other ball bearing as a pivot. Thus the ball bearing will be firmly gripped, preventing its free rolling movement out of its correct position. It will be understood, therefore, that although the principles of this invention are shown as embodied in a particular type of seat slide, these principles are equally applicable to other types of seat slides and to similar combinations in which an anti-friction element is disposed between two relatively slidable members.

Referring more particularly to the drawings, only one of a pair of seat slides which would normally support an automotive vehicle seat is shown in the figures, it being understood that the other seat slide will be of substantially identical construction, and will be installed in generally parallel relation with the seat slide shown. More particularly, the illustrated slide assembly is shown as incorporating the adjustable latching mechanism which is conventional in such seat slides, so that the seat slide of the opposite end, which is not shown, will be identical except that it will omit the manual adjusting elements. The seat slide comprises a riser 11 which is adapted to be secured to the vehicle deck, a rail 12 surmounting the riser, and a slide 13 attached to the seat frame 14 and telescopically engaging the rail, as shown in Figure 4. Disposed between the rail and slide are two longitudinally spaced anti-friction elements 15 and 16 which in the illustrated embodiment comprise ball bearings. The assembly also comprises an adjustable latching mechanism which in the present instance is controlled by a handle 17 which moves a latch 18, the latch being engageable with a rack 19 on the rail having spaced notches 21.

The riser 11 has a base portion 22 of flat configuration for securing to the vehicle deck, and a web portion 23 extending generally upwardly and inwardly from the base portion. This web portion may include a plurality of spaced strengthening ribs 24 and one or more lightening holes 25. The upper end of the riser has a rail supporting portion 26 which is of generally flat arcuate shape, and curves gradually downwardly and rearwardly to accommodate the curved rail 12 which imparts the proper vertical movement to the seat as it is longitudinally adjusted.

The rail 12 comprises a web portion 27 which is in flush engagement with and attached to supporting portion 26 of the riser, and upwardly extending flange portions 28 and 29 on either side of the web portion 27 which cooperate with the web portion to form a channel-shaped lower bearing race. The rail further comprises wing portions 31 and 32 extending outwardly from portions 28 and 29 respectively and in spaced parallel relation above web portion 27 said wing portions serve to telescopically engage the slide 13. The latter element comprises an upper bearing race portion 33 which is of generally inverted channel-shape, a pair of flange portions 34 and 35 extending outwardly from the lower ends of the inverted channel-portion, and rail engaging portions 36 and 37 which are in spaced parallel relation below flange portions 34 and 35, respectively, and which when in assembled position underlie the wing portions 31 and 32 of rail 12. The retaining portions 36 and 37 are joined to the flange portions 34 and 35 of the slide by outwardly curved portions 38 and 39, these portions being of such curvature as to clear the outer edges of the rail 12.

The adjusting means for releasably holding the slide in its longitudinal position comprises the latch member 18 which is pivotally mounted on the slide 13 by a mounting bracket 41 fixed to an intermediate portion of the upper surface of the slide by fasteners 42. The supporting bracket has an outwardly extending portion 43 which holds a pivot pin 44 supporting the latching member 18 for pivotal movement about a vertical axis. The latching member has a toe 45 extending downwardly from its main portion within a slot 46 in the portions 35, 37, 39 on one side of the slide. The toe 45 is normally urged into the slot 46 by a coil spring 47 connected between the latch and the slide. The flange portion 32 of rail 12 is provided with a plurality of notches 21, and the arrangement is such that as the slide is moved along the rail, the slot 46 will be aligned with successive notches 21. The handle 17 is connected by an extension 48 to the latching member 18, the extension being secured to the latching member by a fastener 49 and an interfitting end portion 51. The arrangement is therefore such that counterclockwise swinging movement of the handle 17 in Fig. 2 will withdraw toe 45 from slot 46 and its underlying notch 21, thus permitting longitudinal movement of the slide. Release of handle 17 allows spring 47 to pull the toe 45 back into latching position. A rod or wire 52 is preferably connected to an intermediate portion of handle 17 for transmitting the motion thereof to similar adjusting means incorporated in the slide at the other end of the seat. It will be understood that this construction is conventional and in itself does not constitute part of the present invention.

As stated previously, the slide 13 is supported on the rail by means of two longitudinally spaced ball bearings 15 and 16, ball bearing 15 being adjacent the forward end of the assembly and ball bearing 16 adjacent the rear end of the assembly. However, both of these ball bearings cooperate in the same manner with respect to the rail and slide, as well as with respect to the novel retaining means described below. A description of the disposition and function of the forward ball bearing 15 will therefore suffice to fully explain the nature of the invention. As is best seen in Figs. 1–4, ball bearing 15 is normally disposed within the race portion 27, 28, 29 of the rail 12, and the race portion 33 of the slide 13. When carrying its normal load, that is, a portion of the weight of the seat plus any passengers, the ball bearing will be in contact with the bottom and sides of the rail race and the top and sides of the slide race. During the longitudinal movement of the slide, the ball bearing will of course move at half the rate of speed of the slide. In order to limit the forward movement of the slide, a downwardly projecting stop element 53 is provided in the upper portion of the slide 13, and it will be seen from an examination of Fig. 1 that leftward movement of the slide will eventually cause ball bearing 15 to abut stop member 53, preventing further movement of the slide in a leftward direction. To limit the rearward movement of the slide, a similar projection 54 is disposed adjacent the rear ball bearing 16, and it will be obvious that this projection will act in a manner similar to stop member 53 when the slide is moved to the right in Fig. 1.

It is evident, therefore, that in order to maintain the proper functioning of the stop members, it is necessary that ball bearings 15 and 16 always be maintained in the same position relative to the rail and slide when the latter two members are in a particular longitudinal relation. For example, if the ball bearing 15 were to be disposed farther to the rear than is shown in Fig. 1, when the rail and slide are in their position as shown in Fig. 1, the slide would be permitted less forward movement before stop member 53 abutted ball bearing 15.

The difficulty in maintaining the proper positioning of the ball bearings stems from the vertical play which exists between the rail and slide. This play is evident in Fig. 4 wherein the reference numeral 55 indicates the space existing between slide portions 31 and 32 and rail portions 36 and 37. When the slide is tilted relative to the rail, for example, by pivoting about the rear ball bearing 16 when a passenger leans back in the seat, this play 55 will be taken up, enlarging the space between the slide and rail races as shown in Fig. 5. Due to the inclination of the slide and rail the ball bearing 15 would then be ordinarily free to roll downhill toward stop member 53, and when the slide is subsequently returned to its normal position as shown in Fig. 4, the ball bearing would not be in its proper position.

The novel retaining means for preventing this action from occurring comprises essentially an elongated wire spring 56 which is disposed within the rail race adjacent each ball bearing. This wire spring may be constructed of piano wire or similar material, and is shown in its free state in Fig. 3. It will be seen that when unrestrained the spring has an intermediate bowed or arcuate portion 57, and a pair of oppositely extending mounting portions 58 and 59 which have short laterally bent toes 61 and 62 respectively. These toes are adapted to be inserted in a pair of longitudinally spaced mounting holes 63 in the rail. One of these mounting holes is clearly shown in Fig. 5 and it will be seen that the axis of the holes are diagonally disposed in the juncture of rail race portions 27 and 29. The spring 56 therefore will lie along this corner or juncture of the rail within its race portion, the length of the spring being such that it extends forwardly and rearwardly of the normal forward and rearward positions of its corresponding ball bearing. When the slide is assembled, the ball bearings will be in contact with the bowed portions 57 of the springs, and when the slide is in its normal downward position as shown in Fig. 4, the ball bearings will compress the bowed portions into a substantially flat shape.

The operation of the spring 56 is best seen in Fig. 5, which shows the slide in its upper position which will occur when the slide is, for example, tilted about one ball bearing as an axis. It will be seen from this figure that the enlargement of the space between the rail and slide races will permit the expansion of bowed portion 57 of the spring 56, and due to the diagonal positioning of the spring mounting, portion 57 will expand into the space between the races. This will in turn cause the spring to maintain its engagement with the ball bearing, and the latter will thus be firmly held within the race portion 33 of the slide. The ball bearing will thus be prevented from any longitudinal movement, since the force of gravity tending to roll the ball bearing downhill is not sufficient to overcome the frictional forces holding it in place, namely, the frictional force developed by the pressing of the spring against the ball bearing, which in turn presses the ball bearing against the race portion 33.

It will be observed that the above described action of the spring 56 will occur no matter what the longitudinal position of the ball bearing, since the length of the spring overlaps the normal forward and rearward positions of the ball bearing. It will also be noted that the springs will in no way interfere with the operation of the slide, since they will not obstruct any longitudinal movement of the ball bearings. That is, when the rail and slide are in their normal position shown in Figure 4, which position is brought about by the weight of the seat and any occupants, the ball bearings will be pressed between the race portions of the rail and slide. The rolling action will take place along these members, and the wire springs will be recessed within the corner of the rail between race portions 27 and 29. Although each spring will have contact with its corresponding ball bearing at this time, the contact pressure is slight compared with the pressure on the races. Similarly, the springs will not interfere with the action of stop members 53 and 54, since the springs themselves perform no stopping or limiting action.

It will be understood that the surfaces between which the ball bearings roll have the same frictional characteristics, and that there is therefore no danger of a difference in frictional properties causing displacement of the bearings. In the embodiment of Figures 1-5, the frictional contact when rolling is always between the channel-shaped races and the ball bearings, the contact of the wire springs with the bearings being only incidental as pointed out above. When the parts are in the separated position shown in Figure 5, there will not be any appreciable longitudinal movement between the rail and slide, since this separated condition only occurs momentarily, due, for example, to momentary tilting of the seat. Therefore, there is no danger that the bearings will be displaced due to the difference in frictional properties between the wire spring and the channel-shaped members.

Figures 6 and 7 illustrate a modification of the invention which in principle is similar to that of the first embodiment, but which is shown as incorporating a conventional torque bar 64. The torque bar is pivotally secured to the seat frame 65, shown in dot-dash lines, by means of a pair of brackets 66. The opposite ends of the torque bar are bent downwardly and inwardly, the terminals 67 thereof being slidably disposed within vertical guides 68 in risers 69. The torque bar thus acts in the conventional manner to equalize the longitudinal forces at both ends of the seat. The rail 71 surmounting each riser 69 and the slide 72 telescopically engaging each rail are similar in design and function to that of the previous embodiment. The front and rear ball bearings 73 and 74 are provided with retaining springs 75 and 76, respectively, and these springs cooperate with the ball bearings in the manner described with respect to the first embodiment. It will, therefore, be seen that the invention is equally adapted for installations having the torque bar type of construction, as well as other installations.

Figure 8 illustrates a modified construction which is generally similar in principle to the previous embodiments but in which each ball bearing 77 is prevented from contacting either the rail member 78 or the slide member 79. In this embodiment, four retaining springs 81 are provided for each ball bearing, these retaining springs being disposed along the corners of both the rail and slide members. The relative dimensions of the elements are such that the ball bearing normally contacts only the four retaining springs 81 and is slightly spaced from the surfaces 82 and 83 of the slide and rail members respectively. Each of the retaining springs may be mounted by means of mounting holes 84 in a manner similar to the retaining springs of the previous embodiments, and is of the bowed construction described before.

It will be observed that since the hardened steel bearing does not contact the surfaces of the rail and slide members, the bearing is prevented from indenting these surfaces. Such indentations would normally occur because of the constant vibration to which the assembly may be subjected, for example in an automotive installation. It will be seen that the four retaining springs are free to expand when the rail and slide members are spread apart in a manner similar to that of the previous embodiments. The springs therefore grip the bearing between them and function as before to retain the bearing against unwanted longitudinal movement. It will also be noted that, as discussed with respect to the previous embodiments, there will be no displacement of the bearings due to differences in frictional properties between the bearing-contacting surfaces. In this case, these surfaces constitute the wire springs at all times, these springs of course having similar frictional characteristics.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a seat slide of the type having a rail with a substantially channel-shaped ball bearing race, a slide telescopically mounted on said rail, a pair of ball bearings disposed between said rail and slide and riding in said race, and surfaces in overlapping relation on said rail and slide respectively, said overlapping surfaces limiting enlargement of the space between said rail and slide members, the combination with said seat slide of retaining means for one of said ball bearings, said retaining means comprising at least one elongated wire spring mounted along a corner of said race, said wire spring having a bowed intermediate portion normally urged diagonally into said race toward said ball bearing, whereby said spring will maintain contact with said ball bearing when the space between said rail and slide members is enlarged as limited by said overlapping surfaces.

2. The combination according to claim 1, said spring being further provided with a pair of laterally extending mounting toes at opposite ends thereof, said rail having apertures for receiving said toes.

3. A seat slide comprising a stationary rail member, a slide member in telescopic relation with said rail member, said rail and slide members having channel-shaped races for retaining ball bearings, a pair of longitudinally spaced ball bearings within said races, surfaces in overlapping relation on said rail and slide respectively, said overlapping surfaces limiting enlargement of the space between said races, the normal spacing between said races being determined by the size of said ball bearings, and means for retaining said ball bearings in position when the space between said races is enlarged as limited by said overlapping surfaces, said retaining means comprising an elongated wire spring adjacent each of said ball bearings and mounted within a corner of one of said races, the wire diameter of said springs being such that the springs are recessed within said corner when the space between said races is normal, said ball bearings being in firm contact with said races and in relatively light contact with said springs during such normal spacing, each of said wire springs having a bowed intermediate portion in engagement with its corresponding ball bearing, said bowed portion being expandable into the space between said races, whereby said ball bearings will be maintained in engagement with said other race when the space between said races is enlarged as limited by said overlapping surfaces.

4. In a seat slide of the type having a rail member and a slide member having channel-shaped races, an anti-friction element between said races, and surfaces in overlapping relation on said rail and slide respectively, said overlapping surfaces limiting enlargement of the space between said races, retaining means for preventing longitudinal movement of said anti-friction element except during relative longitudinal movement of the said rail and slide members, said retaining means comprising a plurality of elongated wire spring members secured to said rail and slide members in the corners of said channel-shaped races adjacent said anti-friction element, said element being normally in engagement with said springs and in slightly spaced relation with the adjacent surfaces of said races, said springs each having an intermediate portion urged diagonally into a bowed position toward said anti-friction element, whereby said element will be gripped by said springs when the space between said rail and slide members is enlarged.

References Cited in the file of this patent

UNITED STATES PATENTS

| Number | Name | Date |
|---|---|---|
| 2,003,549 | Miller | June 4, 1936 |
| 2,622,940 | Johnson | Dec. 23, 1952 |

FOREIGN PATENTS

| Number | Country | Date |
|---|---|---|
| 102,899 | Australia | Dec. 30, 1937 |